United States Patent [19]

Emery

[11] 4,116,908

[45] Sep. 26, 1978

[54] PROCESS FOR THE PREPARATION OF A MASTER MIXTURE FOR A POWDER COMPOSITION WITH A POLYVINYL CHLORIDE BASE

[76] Inventor: Guy Charles Emery, 27380 - Radepont Par Fleury-sur-Andelle, France

[21] Appl. No.: 661,532

[22] Filed: Feb. 26, 1976

Related U.S. Application Data

[63] Continuation-in-part of Ser. No. 449,080, Mar. 7, 1974, abandoned.

[30] Foreign Application Priority Data

Mar. 8, 1973 [FR] France ............................. 73.08347
Mar. 8, 1973 [FR] France ............................. 73.08348

[51] Int. Cl.$^2$ ..................... C08K 5/00; C08K 9/12
[52] U.S. Cl. .................... 260/23 XA; 260/23.7 M; 260/31.2 R; 260/31.6; 260/33.4 R; 260/34.2; 260/42; 260/42.49; 260/42.57; 260/890; 260/891

[58] Field of Search ............... 260/42.49, 42, 42.57, 260/34.2, 23 XA, 23.7 M, 31.2 R, 31.6, 33.4 R, 890, 891

[56] References Cited

U.S. PATENT DOCUMENTS

| | | | |
|---|---|---|---|
| 2,835,620 | 5/1958 | Barllett | 260/42.49 |
| 3,101,241 | 8/1963 | McKee | 260/42.49 |

FOREIGN PATENT DOCUMENTS 655,810  1/1963  Canada .................................. 260/42.49

*Primary Examiner*—James H. Derrington
*Attorney, Agent, or Firm*—Robert E. Burns; Emmanuel J. Lobato; Bruce L. Adams

[57] ABSTRACT

The present invention relates to a process for the preparation of master batches used for the compounding of additives into raw PVC (polyvinyl chloride) before fabrication. More particularly, it relates to the process of the preparation of master batches involving a minimum of thermal degradation.

5 Claims, No Drawings

PROCESS FOR THE PREPARATION OF A MASTER MIXTURE FOR A POWDER COMPOSITION WITH A POLYVINYL CHLORIDE BASE

RELATED APPLICATION

This applicaton is a C.I.P. of U.S. Patent application Ser. No. 449,080 filed Mar. 7, 1974 and now abandoned.

BACKGROUND OF THE INVENTION

When preparing polyvinyl chloride (PVC) for manufacturing finished articles, various process-aiding additives are incorporated into the PVC for lubrication, stabilization, shock-proofing, for facilitating processing in special types of machines i.e. extruders injectors etc., for water-proofing, for providing special characteristics, for solubilizing the polyvinyl chloride with other compounding resins, etc., it is useful to incorporate such additives, in the form of master batches. In master batches, such additives are admixed with small amounts of polyvinyl chloride in order to facilitate the uniform distribution of the additives ythrough the final bulk of the entire batch for processing.

Among known processes for the preparation of polyvinyl chloride-based master batches, the following two have been the most commonly used: (a) the granulation process, (b) the dry blend process.

In the granulation process (a), the additives are premixed with some of the resin base before or are injected together with some of the resin base through the mixing chambers of processing equipment. This mixture is then processed by formation of a gel either via a gellifying extruder or between heated rollers to form a semi-molten gelled mass. The mass is then cooled to form solid rods or sheets.

The solid products of the additives, in the gelled resin-base, are then sub-divided into granules which comprise the master batch for incorporation into the entire molding composition. The composition is then shaped by extrusion, injection or similar conventional molding or shaping operations into the final product.

The dry-blend process (b) utilizes the dry admixture of the additives with polyvinyl chloride at elevated but below gelling temperatures wherein the various ingredients of the additives are absorbed by the polyvinyl chloride by raising the temperature of the mixing master batch ingredients. The temperature of the master batch is raised in the range of about 80°–150° C., usually by external heating or also by internal heating resulting from the mechanical friction of the polyvinyl chloride particles and additive materials against each other during vigorous mixing. After the entire batch has been raised to sufficient temperature for the PVC to absorb the additives, the master batch is cooled to room temperature, 20°–35° C. The dry blend process produces dry powder or granules. Where economy is desired over the aforementioned granulation procedure (a), the dry blend method is utilized. This dry blend method can be extended to the point where the polyvinyl chloride for dilution comprises the entire amount of the total processing composition. When this is so, the dry product with absorbed additives is directly introduced into the forming apparatus hopper. When less then the entire batch of PVC is utilized, the dry powder master batch is mixed in a slow mixer such as a ribbon mixer supplied with heated internal surfaces to provide the resin base with the necessary calories for it to absorb the entire amount of additives. This heated absorbed mixture is then the master batch to be distributed through the entire amount of the final PVC composition. Rapid mixing can also raise the temperature of the PVC and additives to the required range.

The granulation process (a) and the dry blend process (b) indicated above are inconvenient, uneconomical and usually degrade the final quality of the product. This degradation results from the heating of the PVC powder and the granulation matter to the usual temperatures in the range 80°–150° C. This heating prematurely uses up the "fresh" characteristics of the vast mass of the PVC resin and its additives. The ultimate effects of this loss of "freshness" are the lowered resistance to impact and a too-rapid thermal degradation of the final shaped product.

THE INVENTION

The present invention provides a process for remedying the inconvenient aspects of the prior known processes and moreover provides master batches for uniformly distributing additives through the entire molding composition to overcome the loss of "freshness" in the composition and its shaped products. Further the present invention considerably lowers the operating costs of the preparation and distribution of master batches through the total polyvinyl chloride molding composition.

The present invention is based upon the incorporation and/or absorption in the master batch of all the additives which require heat for absorption into a portion of polyvinyl chloride to form a first constituent mix which is heated to the proper temperature for rapid absorption of these additives by the PVC. This first constituent mix is then mixed into and with a second constituent mix of other additives and PVC maintained at lower temperatures in order to dissipate the caloric content of the heated batch and cool it as rapidly as possible. The heated batch is thus distributed through the cooler second constituent mix. When the temperatures have stabilized, a uniform final mixture of the full mass after cooling forms the master batch.

The process of this invention for preparing master batch mixtures for use in the manufacture of PVC articles includes the step of forming a first constituent mix of an amount of polymer or copolymer resin of PVC with polyvinylidene chloride used in PVC manufacture with additive components for PVC manufacture which require heat in the temperature range 60°–190° C. for uniform distribution through said amount of polymer or copolymer and heating this first constituent mix. The heating in a first mixer is continued until the additive components, liquid and solid, are uniformly distributed through and/or absorbed upon said polymer or copolymer resin. The quantity of the resin in the first constituent mix is less than the amount of all resins subsequently introduced in subsequent stages of the preparation of the master batch. When the distribution or absorption of the additives in the first constituent mix is completed i.e. with the temperature of said first mix being in the range 80°–150° C., the first constituent mix is discharged from its mixer into a second mixer. The second mixer contains or is concurrently receiving a second constituent mix. The second constituent mix consists of resins and additional additives for PVC processing. The resins in said second mix exceed in weight the amount of resins in said first mix and include PVC polymer and copolymer resins. The additive components of the second mix include the additives which do not require heat for absorption and/or distribution as well as those additives which are heat labile at the temperature range of said heated first mix.

The second mix contained or being introduced into said second mixer is preferably maintained at least 25° C. below the lowest temperature of said heated first mix but preferably is precooled either before or in said second mixer. The cooling and the lower temperature of said second mix is required in order to dissipate the heat content and quickly lower the temperature of said first batch to about room temperature i.e. 20°–35° C. The weight and volume as well as the degree of precooling of the second mix and the added cooling by the second mixer are adjusted to equilibrate the temperature of the contents of the second mixer, the first and second constituent mixes, to room temperature range preferably in less than 15 minues. The cooled mixture from said second mixer constitutes the master batch.

Preferably and by way of example the first constituent mix is formed by a mixing of a small quantity of polyvinyl chloride, any additive resin such as normally incorporated to shockproof, or water-proof or provide barriers in the final moulding composition; additives known for their "process aiding" proclivities or liquid additives such as are useful for facilitating the processing of the final compounded polyvinyl chloride through the shaping machinery i.e. the extruder or injector.

Specifically to be included in the first constituent mix are those additives which require heat for absorption into the PVC matrix or which require the "opening of the pores" of the PVC for uniform distribution and/or absorption of the additive components of this first constituent mix.

Into this mass are also incorporated any other resins, polymers, copolymers, or promoters which require hot-absorption by the polyvinyl chloride.

The mixture is then heated, either in an heated mixer, by heating elements contained in/or on the exposed surfaces thereof, or spontaneously heated by rapid agitation in the mixer, until there is a complete and total inclusion of any liquid additives or complete opening of the pores of the polyvinyl chloride mixture to the other polymers. When such absorption is completed, usually at temperatures in the range 60°–150° C. this small first constituent mix is then released, poured or dumped or otherwise incorporated into a larger mass of polyvinyl chloride polymer or copolymer, containing other additives which do not require heat for incorporation or which should not be heated, which is the second constituent mix. This second and larger constituent mix is maintained at lower temperatures then the first mix, in order to rapidly dissipate the heat content of the heated first mix and to reduce the temperature thereof to temperatures at or below ambient plant operating temperatures i.e. below about 35° C. Ambient or room temperatures for purposes of this invention are in the range 15°–35° C.

The term "additives" as used herein and as exemplified below is directed to and includes the various materials added to moulding compositions to improve the final products or the processing to form such products. They may be liquid or solid, simple compounds, complexes, chelates, monomers, polymers, lubricants, stabilizers, "processing-aids", cross-linking agents, epoxydized oils, long chain alcohols. These additives can be classified into two groups; those that are heat-stable and cause no deleterious effects to the final product after being heated to temperatures above about 80° C., and those that are heat labile and should not be heated above 80° C. before the final processing and shaping.

Most prominent of the additives are the stabilizers. The stabilizers normally used in PVC compositions have different purposes, namely either long-term stabilization of the resin composition or a rapid inhibiting effect acting on the coloration and protection of the first stage of manufacture, i.e. before the material gels. Among long-term stabilizers, such as epoxydized oil, liquid stabilizers, chelating liquids, and certain liquid lubricants or those with a low melting point, and certain charged substances, the action of those with epoxydized oil can give rise to specific qualities in certain specified applications, have the advantage of being absorbed into a small quantity of polyvinyl chloride (or of additional resins) of which one of the principal qualities is very easily to absorb any liquid by simple heating and not to lose them again until the gelling stage, i.e. a given period after its application to the extruder. It is therefore important that these stabilizers should act exactly at the time when the mass of polyvinyl chloride will require their effect. In the process according to the invention the additives are added to the polyvinyl chloride alone or combined with additional resins such as shock-proof resin, waterproofing or barrier resin, resin of the kind known as "process-aiding" for facilitating passage through the forming machines, or a polymer resin having a solubilizing action between polyvinyl chloride and the other resins). These materials form the first constituent mix.

Moreover, the other short term stabilizers and lubricants that have their effect either initially on application, when the polyvinyl chloride or the additional resin is still in powder form, or at the onset of gelling, are generally blended, in the process of this invention, by means of cold mixing into the second mix, with supporting media such as shock-proof resins or resins assisting passage through the machine (processing aids), or indeed any resin other than polyvinyl chloride, the specific qualities of which are useful in the forming operations.

Cold blending of the second mix, due to the mechanical effect of the second mixer, which also acts as a cooler, leads to adsorption around the granules of the additional resins and additives that will be released immediately in the forming machine in the course of passage through the initial heating zones. These additives are thus placed in contact with the fresh polyvinyl chloride with which the master batch is blended on or before entry to the hopper.

A practical embodiment of the process according to the invention is stated below, compared with known processes.

EMBODIMENT 1

COMPARISON EXAMPLE 1

While working on test-pieces of polyvinyl chloride manufactured from ordinary dry blended powder of the prior art, with the aid of a plastograph of the "brabender" type set at a temperature of 190° C., a rotating speed of 75 rpm, and in a 30 gramme pan, a decomposition rate varying between 7 and 12 minutes is obtained with thermal curves whose threshold lies towards 195° C. During a gelling rest using ordinary dry blend powder, under pressure, at a temperature of 150° C. and a speed of 30 rpm, gelling curves are obtained that indicate the onset of gelling at between 30 seconds and 1 minute.

EXAMPLE 1

Working with the same formulation of polymer ingredients and additives but manufactured by the master batch process according to the invention, it is noted that resistance to decomposition is increased from 1 to 5 minutes and the threshold of the thermal curve is lowered from 1° to 5° C. This indicates a reduction in self-heating within the material itself. Moreover, the gelling time is reduced by one-half.

EMBODIMENT 2

The formulation below is of the type of compositions that may be used, for example, in extrusion by blowing. The results obtained by prior art and the manufacturing process of this invention are given for comparison. It should be noted that the additives indicated may vary in proportion or in equivalent materials according to the type of machine used and the article that is to be manufactured.

Composition formula:
1. P.V.C., suspension or solid, K value between 50 and 65:100 parts (by weight)
2. Shock-proof agent, methyl acrylonitrile-butadiene-styrene (MABS or MBS or ABS:5 to 15 parts
3. Epoxydized oil (stabilizer):0.5 to 5 parts
4. Ca/Zn complex (stabilizer), and its chelate trinonylphenylphosphite:0.05 to 0.4 parts
5. Alpha phenylindol (stabilizer):0.05 to 0.5 parts
6. Phenylphenoxyepoxypropane (stabilizer):0 to 0.6 parts (Items 2) through 6) constitute the first mix.

The remaining items below with at least 20 parts of PVC constitute the second mix.

7. Lubricants-with alcohol in C18 and hydrogenized castor oil base:0.2 to 2 parts
8. Trimontanate of glycerol (lubricant):0.05 to 0.5 parts
9. Lubricant with Ca montanate base:0.02 to 0.4 parts
10. Aid for passage through machine (processing-aid):0.5 to 10 parts
11. Silica (preferably colloidal):0 to 1 part.

COMPARISON EXAMPLE 2

Traditional prior preparatory process of dry blend powder type (process according to paragraph (b) under BACKGROUND OF INVENTION (supra).

A 500 liter rapid mixer is used in which 200 kg of polyvinyl chloride resin and additives (density about 0.5) are introduced. The temperature of the mixture is raised to between 80° and 150° C. within about 15 minutes. The mixture is subsequently cooled in a 1700 liter vat for a further 15 minutes. A complete cycle thus requires a mixing period lasting 15 minutes of continuous working. The two operations can be carried out simultaneously, producing a total quantity of 200 kg of moulding composition.

EXAMPLE 2

Process according to the invention:

The additive resins amount to 10 to 12 parts by weight per 100 parts of polyvinyl chloride.

By this process a manufacturing time fairly close to that indicated above is obtained: in fact, for 170 kg of master batch (of a density less than 0.5) there are 15 minutes of hot first mix manufacture and 15 minutes of cooling, i.e. 15 minutes of continuous working for the two operations. Since the total mass of the master batch represents about 20 parts by weight per 80 parts of fresh polyvinyl chloride resin in the composition introduced at the time of manufacture, it is evident that the same manufacturing time of 15 minutes in this case allows 850 kg of composition material to be prepared, namely 170 kg of master batch and 680 kg of fresh polyvinyl chloride resin. The PVC can include up to 200 kg of crushed polyvinyl chloride products from trimmings etc. which may be blended, by dry blending, as in the case of the manufacturing process using dry blended powder.

According to another aspect of this invention, which is recommended where the quantity of liquid additive is large, as for example: 200 kg of material comprising 3 to 6 parts in weight of polyvinyl chloride, 0.5 to 5 parts of epoxydized oil, and up to 0.5 parts of the chelate, is introduced into the first or rapid mixer which heats by friction. In the absence of epoxydized oil, other liquid stabilizers and liquid lubricants may be used. The temperature in this first mixture is raised to between 80° and 150° C.

While the 200 kg of material aforesaid is mixed in the rapid, hot, first mixer; 320 kg of additional resins and additives such as stabilizers, lubricants and chargers, where necessary, all in solid state comprising the second mix, are introduced into the cooling second mixer.

When the powder in the first rapid mixer constituting the first mix attains the optimum temperature, it is poured or dumped into the second mixer containing the second mix of 320 kg. A final mixture is obtained which, comprises a master batch mixture of 520 kg prepared after only 15 minutes of treatment. This brief total time is obtained by the rapid dispersion of calories in the first, hot, mix (200 kg) upon coming into contact with the large mass (320 kg) of cold powder in the second mix. It is evident that during the period of 15 minutes required to prepare 200 kg of complete compound by the traditional dry blend process, using dry powder, 170 to 520 kg of master batch can be prepared, which corresponds to a complete molding composition of 850 to 2600 kg. This composition being obtained without any loss in time when recycling the crumbled composition residues from the moulding machines.

It is clear that the major portions of the basic resins used in these various operations have not undergone any prior heating. However, they may contain small amounts of adsorbed gases or water absorbed from the ambient humidity, which may give rise to bubbles in the manufactured articles, particularly in the case of machines not including a degassing station. It is therefore useful, before pouring the master batch into the machine hopper, that the entire composition pass through a small drying facility, formed, for example, by a sleeve heated by electrical resistances connected to a thermostatic control, and including a screw activated by a servo-variator calibrated in accordance with the output of the machine producing the finished article, to dry the materials by preheating just prior to processing.

Comparative tests have been made with various industrial control mechanisms contrasting articles manufactured by the method to which the present invention refers and others under the traditional dry blend powder processes.

By way of example, 1½ liter bottles have been manufactured from PVC resin materials by extrusion blowing. A number of bottles were produced by the traditional dry blend powder process. These bottles each weighed 53 grammes. A number of bottles were produced by the process in accordance with the invention, each weighing 47 grammes (thus 6 grams lighter).

In spite of this weight difference, it has been found in "drop tests" that the results obtained with both types of bottles were identical. Similarly, after the both types of bottles had been filled with water and had been subjected to increasing pressure, plotted by means of a manometer, it was noted that the pressure thresholds, in the order of 35 to 40 bars, at which the first signs of deformation appeared, were the same in both cases.

EMBODIMENT 3

Embodiment of the process according to the invention applied to the manufacture of a gas and damp-tight composition intended for the manufacture of waterproof articles, particularly bottles for containing carbonated drinks or easily oxidized liquids.

In order to render the composition gas and damp-tight, the following formulation was adopted for the master batch.

Co-polymer of polyvinyl chloride - polyvinylidene chloride:10 to 30 parts
Shockproof agent:5 to 10 parts
Tin stabilizer:0 to 1.5 parts
Solid or liquid organic stabilizers:0 to 1 part
Lubricants:0 to 2 parts
Metallic soap:0 to 1 part
Processing aid:1 to 5 parts
Anti-oxydizer:0 to 0.5 parts
Chelate:0 to 0.4 parts
Epoxydized oil:0 to 0.5 parts
Silica:0 to 2 parts.

In this case the manufacturing process with additional resins is applied, otherwise known as non-polyvinyl chloride.

Bottles were made with the above formulation and subjected to permeation tests with carbonic gas at 25° C., under isostatic pressure with a premeabilimeter (Lissy). The bottles subjected to the tests were on average 700 microns thick.

The extremely low permeability could not be measured since this proved to be less than $3ml/m^2/24h$, which represented the lower limit of the apparatus. The bottles manufactured in this way are light coloured and highly transparent.

The colloidal silica was blended into master batch composed of shockproof agents, epoxydized oil, Ca/Zn stabilizer (calcium - zinc), organic stabilizers, lubricants on C16 and C18 alcoholic base, internal lubricants, external lubricants, and a processing aid.

The colloidal silica was blended at a rate of 0.05 to 2.0 parts by weight of the master batch or a maximum of 0.2 parts of the moulding composition. Polyvinyl chloride bottles were produced from compositions containing such a mater batch and were tested for gas-tighness on standard apparatus of the Lissy type.

The following results were obtained from these comparative tests:

In bottles produced under ordinary dry blend formulations, the permeability varied from 0.3 to 1.0 milliliters of gas per hour and per bottle.

In bottles produced by "pressure" type formulations with heavy polyvinyl chloride walls, the permeability of 0.2 to 0.4 milliliters/h/bottle were determined;

In bottles produced according to the master batch preparation process according to this invention, with the above described addition of colloidal silica, the permeability measured varied between 0.1 and 0.15 ml/h/bottle.

Under this process preference is given to the use of colloidal silica characterized by a granulation of 5 millimicrons to 100 millimicrons, a specific surface of 300 to 400 $m^2$ per gramme, and containing 80 to 99.8% of pure silica.

It is moreover clearly understood that the various methods of implementing the invention as described above, are stated purely by way of example and are in no way exhaustive. They may be subject to many modifications without thereby going beyond the scope of the present invention.

What is claimed is:

1. A process for the preparation of a master batch mixture for polyvinyl chloride polymers, comprising heating to a temperature in the range of 80° C. to 150° C. in a mixer a first constituent mix comprising a mixture of a polymer selected from the group consisting of polyvinyl chloride, a copolymer of vinyl chloride with polyvinylidene chloride and a mixture thereof, at least one additional resin which is a shockproof, water-proof or barrier resin and is selected from the group consisting methyl acrylonnitrile-butadiene-styrene, methylacrylate-butadiene-styrene, acrylonitrile-butadiene-styrene and polymerization additive, capable of being absorbed at temperatures in the range 80° C.–150° C. by said polymer, said additive being selected from at least one member of the group consisting of stabilizer and lubricant, the quantity of resin present in said first constituent mix being less than that of further resins introduced hereafter; transferring said heated first constituent mix, after a period of time sufficient for total absorption of said additive in said polymer of said first heated constituent mix into a second mixer already containing or then receiving a second, cooled or unheated constituent mix comprising an additional amount of said polymer and said additive maintained at a temperature at least 25° C. below said heated first constituent mix; mixing both constituent mixes to achieve rapid cooling by dissipiation of the heat content of said first constituent mix by said second constituent mix and cooling the resultant mixture to room temperature to provide a final master batch mixture.

2. The process according to claim 1 wherein said first and second mixes, in said second mixer, are cooled to room temperature range within 15 minutes.

3. The process according to claim 1 wherein prior to forming, additional resin and the master batch are mixed and the mixture is treated by heat and/or vacuum to eliminate any occluded gas or moisture.

4. The process according to claim 1 wherein powdered silica is blended with the master batch mixture.

5. The process according to claim 1 wherein said constituent mixes include the copolymer of vinyl chloride and vinylidene chloride.

* * * * *